April 7, 1925.
J. HAYES
AUTOMOBILE BUMPER
Filed July 28, 1923
1,532,487
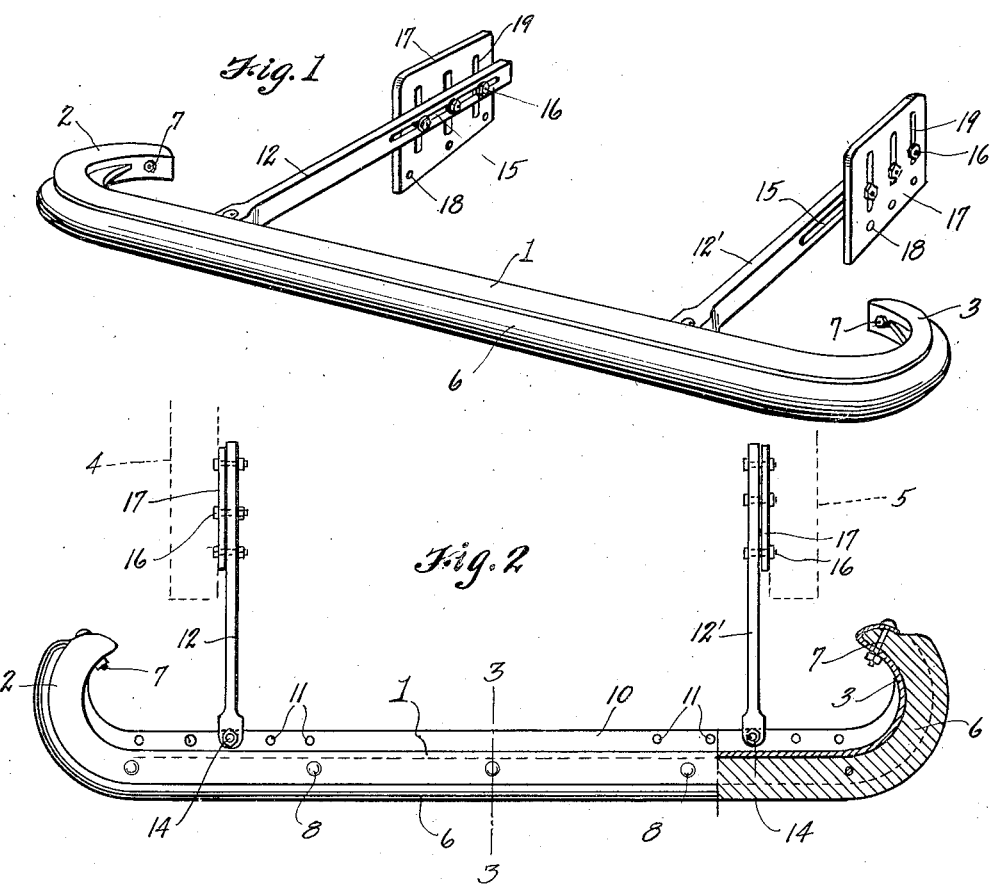
INVENTOR
JEREMIAH HAYES
BY
Richard J. Cook
ATTORNEY Patented Apr. 7, 1925.

1,532,487

UNITED STATES PATENT OFFICE.

JEREMIAH HAYES, OF EVERETT, WASHINGTON.

AUTOMOBILE BUMPER.

Application filed July 28, 1923. Serial No. 654,364.

*To all whom it may concern:*

Be it known that I, JEREMIAH HAYES, a citizen of the United States, and a resident of Everett, Snohomish County, Washington, have invented certain new and useful Improvements in Automobile Bumpers, of which the following is a specification.

This invention relates to improvements in automobile bumpers, and has for its principal object to provide a device of that character embodying a cushioned bumper bar of novel shape and construction and which has supporting members of an adjustable character which provides for its being mounted on automobiles of different make.

More specifically, the invention resides in the provision of a bumper wherein the bumper bar is of channel construction with a solid rubber or pneumatic cushion held in the channel to receive the shock of impact to thereby greatly reduce the jar on the vehicle and bar mountings and which will prevent marring of the object engaged.

Other objects of the invention reside in the various details of construction of the bar, its supporting means and method of mounting the same on a vehicle.

In accomplishing these and other objects of the invention, I have provided the details of construction, the preferred forms of which are illustrated in the accompanying drawings, wherein—

Figure 1 is a perspective view of an automobile bumper embodied by the present invention.

Figure 2 is a top view of the same, shown partly in section for better illustration.

Figure 3 is a transverse sectional view, taken on line 3—3 in Figure 2.

Figure 4 is a sectional view illustrating an alternative construction.

Figure 5 is a partial plan view of a bumper of an alternative construction having a cushioned mounting.

Figure 6 is a transverse sectional view of the same.

Referring more in detail to the several views of the drawing—

1 designates the bumper bar proper, which preferably is of channel iron construction, opening forwardly and having its opposite ends 2 and 3 curved rearwardly and inwardly. Seated within the channel bar and projecting therefrom is a rubber cushion 6, which extends the length of the bar with its opposite ends held secure to the end portions of the bar by means of bolts 7, or the like, extended through these parts. Along the central or body portion, the rubber cushion is held within the channel by means of bolts 8 extended vertically through the opposite side flanges of the bar and through the rubber cushion, as shown in Figure 3.

Formed longitudinally of the bar 1 along its back side, is a rib 10 provided with spaced apart apertures 11. Arms 12—12' are provided for supporting the bar at opposite ends, and the forward ends of these are slotted, as at 13, to receive the rib therein, and bolts 14 are extended through these forward ends of the arms and through apertures in the rib to secure the bar thereto. The rearward portions of the two supporting arms are provided with longitudinally extending slots 15 through which bolts 16 are extended to secure the arms to plates 17 that may be secured in any suitable manner to the forward ends of the opposite side beams 4 and 5 of the frame of the vehicle whereon the bumper is used.

The plates 17 are provided along their lower edges with holes 18 to receive the bolts or rivets whereby they are mounted on the vehicle frame and are provided with a plurality of vertical slots 19 through which the bolts 16 are extended. These vertical slots in the plates, and horizontal slots in the arms 12, provide for adjusting the latter forwardly or rearwardly, also upwardly or downwardly so that the bumper bar may be held at any desired position within its limits of adjustment. The spaced apart apertures in the bar rib provide for spacing the arms closer or farther apart to fit the vehicle frames of different widths.

If it is desired a bar of the type illustrated in Figure 4 could be used. In this construction the bar comprises upper and lower complemental sections 24 and 25, each with a flange 26 at its back edge which may be bolted together to clamp the cushion bar therein.

In Figures 5 and 6, I have illustrated a bar of a similar character except in its connection with its support. In this construction the bumper bar is supported yieldably from a fixed bar 30 that is rigidly supported from the vehicle frame by the arms 12—12'. A plurality of pins 31 are fixed in the bumper bar at equal intervals and these extend slidably through the supporting bar. Nuts 32 are fixed on the ends of the pins to prevent them coming out of the support and springs 34 are coiled about the pins between the back wall of the bumper bar and the supporting bar. These springs serve to take up jar of impact. If it is desired a pneumatic tube 36 may be used in place of the solid rubber cushion.

Assuming that the bar and its supporting means are so constructed, it is readily apparent that it can be fitted readily to vehicles of different type, and can be adjusted to desired heights. The rearwardly curved ends prevent their being caught by passing vehicles or when the vehicle equipped with the bumper is backing up.

It is readily apparent that various changes in the details of construction could be changed without departing from the spirit of the invention, and for this reason I do not wish to be limited to the details illustrated.

Having thus described my invention, what I claim as new therein and desire to secure by Letters-Patent, is:

1. The combination with a vehicle frame comprising opposite side beams, of plates secured to the said beams at opposite sides of the frame; said plates having a plurality of vertical slots therein, a bumper bar, comprising a forwardly facing channel bar, a rubber cushion seated in the channel, supporting arms fixed at their forward ends to the bumper bar and having longitudinal slotted inner ends disposed adjacent the said plates and bolts extended through said slotted ends and through the slots of the plates to secure the arms at adjusted positions.

2. The combination with a vehicle frame, comprising opposite side beams, of a pair of supporting plates fixed to the said beams at opposite sides of the frame; said plates having vertical slots therein, a bumper bar comprising a forwardly opening channel beam with its opposite ends curved rearwardly and inwardly, a rubber cushioning member secured within the channel bar, said bumper bar having a longitudinal rib along its back side provided with openings therethrough, supporting arms for the bar having slotted forward ends and receiving the said rib and bolts extended through said ends and through the rib openings; the rearward ends of the said arms having longitudinal slots therein and disposed adjacent to the supporting plates and bolts extended through said slotted ends of the arms and through the plate slots to secure the arms at adjusted positions.

Signed at Everett, Snohomish County, Washington this 13th day of July, 1923.

JEREMIAH HAYES.